United States Patent [19]
Wilson

[11] Patent Number: 5,539,189
[45] Date of Patent: Jul. 23, 1996

[54] CARD HOLDER'S PAGING SYSTEM FOR COMMERCIAL CARD DATA NETWORK

[75] Inventor: Sheila Wilson, Victoria, Canada

[73] Assignee: Hopeman Enterprises Ltd., Victoria, Canada

[21] Appl. No.: 982,719

[22] Filed: Nov. 27, 1992

[51] Int. Cl.[6] .................................................. G06F 17/60
[52] U.S. Cl. ........................... 235/379; 379/93; 379/96
[58] Field of Search ........................ 235/379; 379/67, 379/88, 90, 91, 95, 93, 94, 96

[56] References Cited

U.S. PATENT DOCUMENTS

| | | | |
|---|---|---|---|
| 4,582,959 | 4/1986 | Myslinski et al. | 379/94 X |
| 4,645,873 | 2/1987 | Chomet | 379/93 |
| 4,727,243 | 2/1988 | Savar | 235/379 |
| 5,243,645 | 9/1993 | Bissell et al. | 379/211 |
| 5,265,033 | 11/1993 | Vajk et al. | 235/379 X |

FOREIGN PATENT DOCUMENTS

| | | | | |
|---|---|---|---|---|
| 2640782 | 6/1990 | France | | G06K 19/06 |

*Primary Examiner*—Donald T. Hajec
*Assistant Examiner*—Michael G. Lee
*Attorney, Agent, or Firm*—John Russell Uren

[57] ABSTRACT

A financial or commercial database network is disclosed which provides a medium for communicating non-financial information from a third party to a network card holder. The third party identifies the card holder to the financial database and places a message in the financial database for the identified card holder. Subsequently, in the course of conducting a card-based financial or commercial transaction, the card holder receives the message at the network node he is currently using.

22 Claims, 3 Drawing Sheets

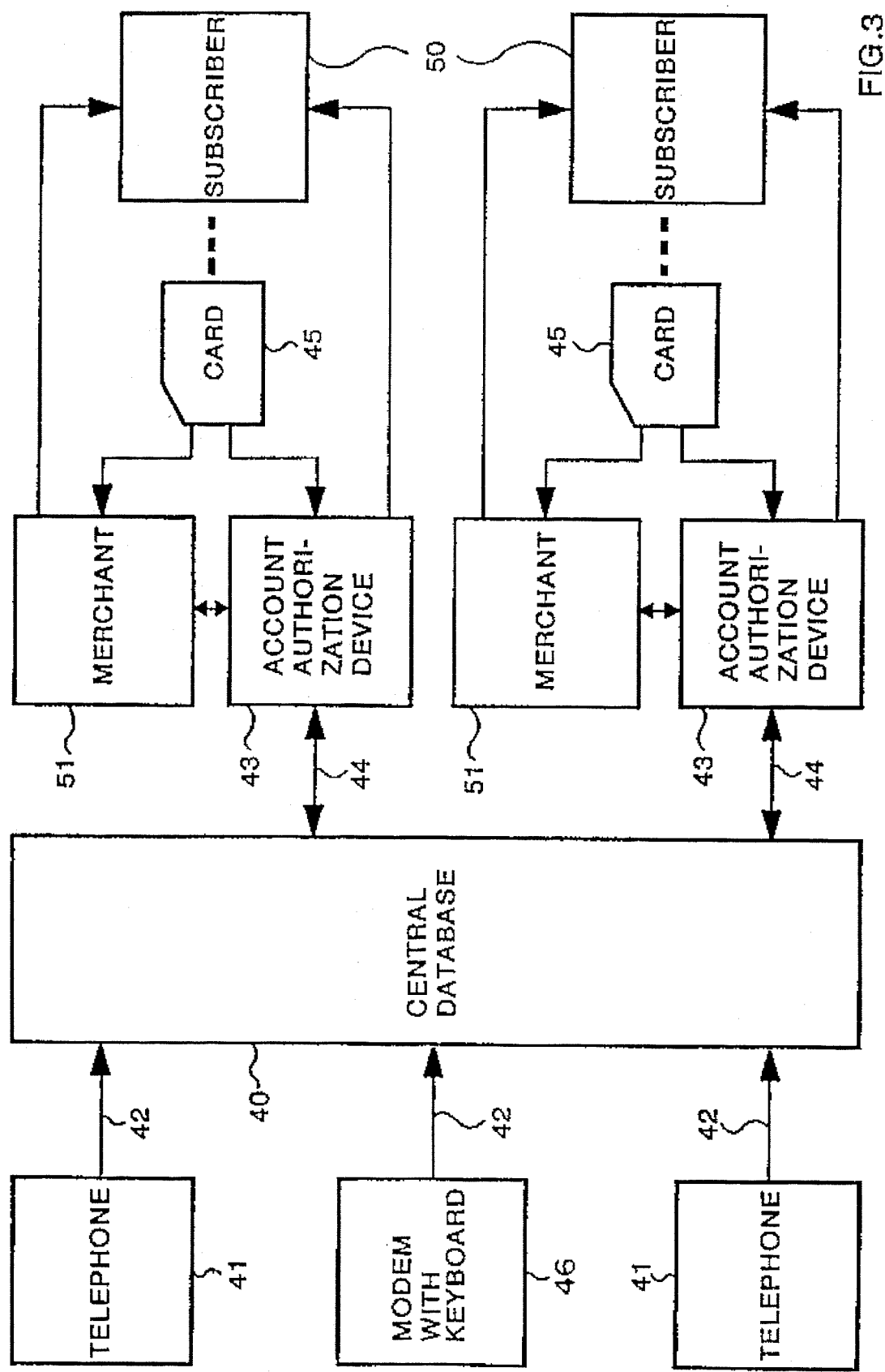

5,539,189

CARD HOLDER'S PAGING SYSTEM FOR COMMERCIAL CARD DATA NETWORK

FIELD OF THE INVENTION

The invention relates to a communication network and, more particularly to a method and apparatus for using a financial database network to communicate messages to card-bearing subscribers.

BACKGROUND OF THE INVENTION

Point of sale transaction authorization devices, in which a purchase is registered against the account of the purchaser and electronic banking machines or automated teller machines ("ATM"s) are well known and widely used systems. Such systems will collectively be referred to hereafter as "account authorization systems". Also well known and widely used are telephone paging systems.

An account authorization system allows a user to complete commercial or financial transactions without recourse to either cash or a bank teller and generally comprises three elements; namely a database which stores financial information for each account; a code, either secret or otherwise, to permit outside access to each account record individually; and a communication network which allows access to the system and which communicates the codes and account authorization instructions between the database and a system user. The code is generally encrypted on an identification card and the communication network is generally a telephone network which is accessed using either the usual telephone or a modem equipped card-reader/display terminal such as the I.B.M. model 5990 and similar apparatus built by Philips, N.C.R. and International Verifact Inc.

In a conventional transaction authorization system, a customer wishing to conclude a cashless transaction supplies his identification card by, way of a credit card, a debit card or a bank client card, to a merchant at the point of sale. The merchant relays the customer's identification codes, using a telephone or a cardreader, to a financial institution which instructs the merchant whether to complete the transaction based on the identified customer's credit history and account information as contained in his account record in the central database.

In a conventional electronic banking system using an ATM, the user directly interacts with the financial institution's central database. The merchant is bypassed and transaction information and instructions are conveyed directly to the user.

In a transaction authorization system, once the customer has communicated his identification code to the merchant, further direct communication occurs only between the financial institution and the merchant. Further communication to the customer will only take the indirect form of the merchant completing the transaction or refusing to complete the transaction due to an unspecified detected irregularity such as overdrawn credit lines or a stolen card alert.

When a user engages in direct communication with the financial institution, as is the case with an electronic banking system or ATM, the communication is in the nature of system commands instructing the user how to complete a transaction. The communication does not include information independent of the account authorization system. A similar distinction between types of information exists between a radio frequency carrier and its audio frequency signal and between a computer operating system program and the files on which it operates. Applying the analogy to the account authorization system above, the ATM directs operating system commands to the user but the system is a carrier without a signal.

Reference is made to French Patent Number 2640782 (Daibillan). The '782 reference describes a network of card-accessible electronic notice boards. By inserting an identification card at one notice board, a subscriber can post to the network a message for a second subscriber to be received by the second subscriber upon insertion of his identification card at any notice board on the network.

However, the network described in the '782 patent is dedicated to exchanging messages between individual subscribers who are financially responsible for the construction and maintenance of the system. The limited purpose and demographic distribution of the network users would limit the network's size as compared to a financial database network created by large financial institutions to facilitate national and international financial transactions. This network size limitation will be embodied in fewer nodes, shorter distances between nodes and fewer subscribers. By analogy, the information on this network would be trapped by an inadequate carrier or operating system.

In a conventional telephone paging system, a plurality of telephones are connected through a telephone network to a central computer. To page a subscriber, a person telephones the central computer and enters a message. The central computer then broadcasts via radio waves a paging signal addressed to the specified receiving device or "pager" such as a Motorola model A05KLB5362CA. The specified pager then flashes, beeps, oscillates or otherwise notifies the subscriber of the message pending. Such a pager, however, will only function when operated within the bounds of its radio network and the pager must include electronic circuitry to operate as a receiver/signaller. Both of these requirements make it difficult to contact a pager subscriber during extended unorganized travel and, of course, this method of content is limited to individuals who may carry a pager.

OBJECT OF THE INVENTION

People travelling whether nationally or internationally, whether they travel with or without a detailed itinerary, can be difficult to contact. If there is an emergency or other important matter, it may be difficult or impossible to contact the individual.

Facsimile machines, telephones, telegrams and couriers deliver information to a previously ascertained location. Broadcast media such as radio, television and print can deliver information over a wider area but at a time where the individual is not available. Accordingly, delivery to a specific individual is uncertain. Further, broadcast media are generally not available for transmissions from individuals and do not afford the necessary element of confidentiality that may be required for many messages.

It is an object of the invention to provide a means to communicate confidential emergency or other important messages over potentially large distances to a specific person at numerous ascertained locations which may be used by the individual.

It is a further object of the invention to include in said means for communication a receiving device that many potential users already have the habit of carrying conveniently and using frequently for other purposes.

It is a further object of the invention to include in said means for communication a pre-existing communication network.

SUMMARY OF THE INVENTION

According to the invention, there is provided a system for supplying non-financial information to the holder of a bank or charge card of a financial institution and bearing an authorization code, said system comprising a central database, means for placing financial information of said financial institution relating to said holder in said central database, means for placing non-financial information received from a party other than said financial institution and intended for said holder in said central database, an account authorization device to read said authorization code of said bank or charge card and to identify said holder to said central database and means for conveying said financial information and advice concerning said non-financial information to said holder of said bank or charge card.

According to a further aspect of the invention, there is provided a method for a user to contact a subscriber having a bank or charge card of a financial institution, comprising the steps of said user contacting said financial institution and providing specific identifying data unique to said subscriber, said user providing said financial institution with non-financial information intended to be provided to said subscriber, said financial institution placing at least some of said non-financial information into a central database intended for transmitting to said subscriber, said financial institution conveying said non-financial information to said subscriber when said subscriber uses said bank or charge card.

BRIEF DESCRIPTION OF THE DRAWINGS

A specific embodiment of the invention will now be described, by way of example only, with reference to the accompanying drawings in which:

FIG. 3 is a block diagram of a card paging system according to the present invention.

DESCRIPTION OF SPECIFIC EMBODIMENT

Figure 1:
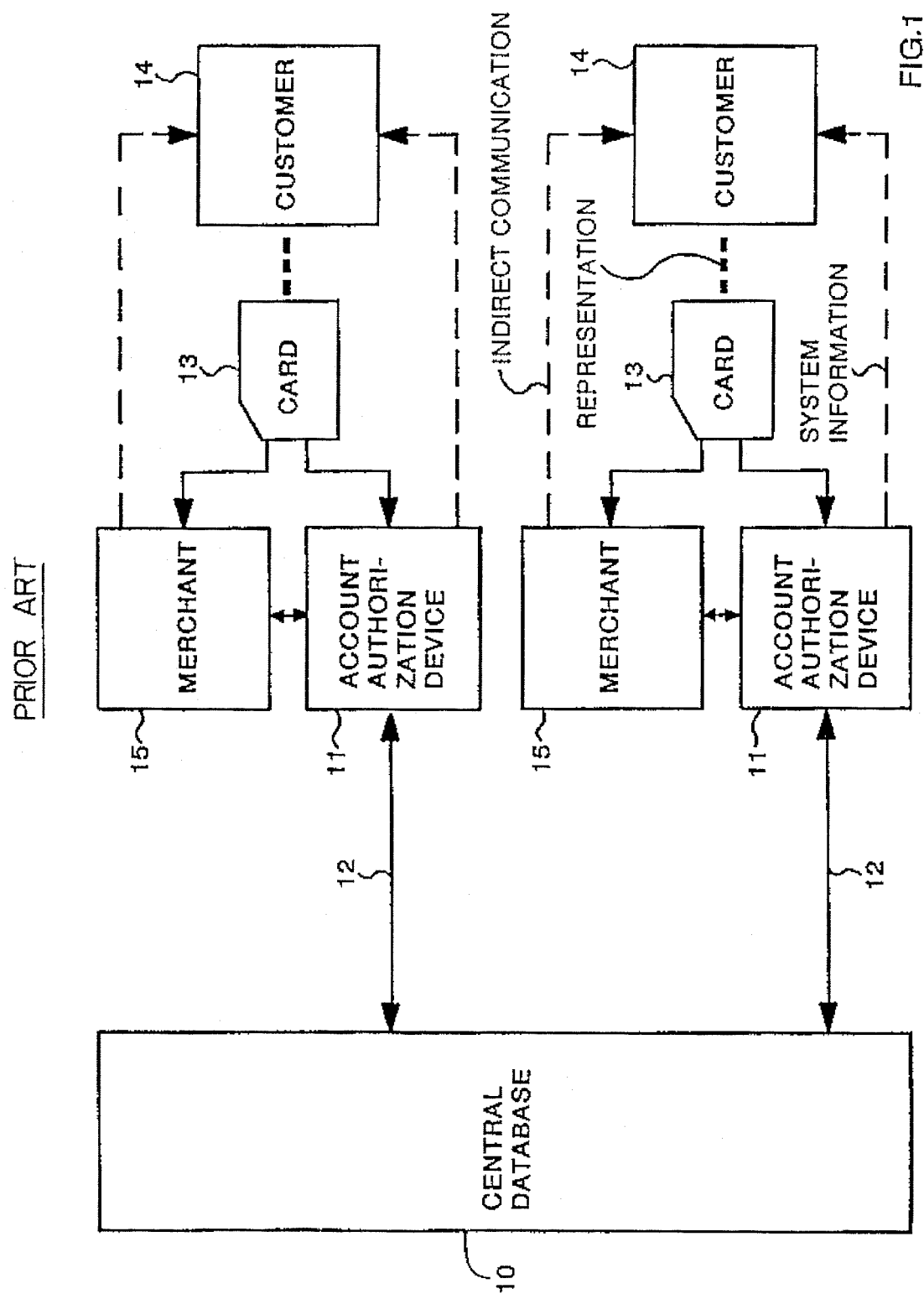
FIG. 1 is a block diagram of a conventional account authorization system, in particular a transaction authorization system or electronic banking system.

A conventional account authorization system known in the art is generally illustrated in FIG. 1. It comprises a central database 10, a plurality of account authorization devices 11 connected to the central database by communication channels 12, and identification cards 13 which are operable to represent to the system by identification codes on the cards an identification of the customer 14. The account authorization devices 11 supply the identification codes to the central database 10. In the case of an electronic banking system or ATM, no further elements are present or required. In the case of a transaction authorization system, at a business location, for example, a merchant 15 takes the identification card 13 from the customer 14 supplier manually or by "swiping" the identification codes of the card 13 to the account authorization device 11. Such authorization devices 11 may take the form of a telephone or a modem equipped card-reader/display terminal.

In operation a customer 14 submits his identification card 13 to an account authorization device 11 either directly (in the case of an electronic banking machine) or indirectly through a merchant 15 (in the case of point of sale transaction authorization). The account authorization device 11 conveys the identification codes to the central database 10 over communication channel 12. The central database 10 uses the identification codes to locate the customer's 14 account record to determine if the transaction should proceed and such decision is conveyed back to the account authorization device 11 via communication channel 12. The subscriber 14 or the merchant 15 will then be directly informed whether the transaction is authorized to proceed.

Figure 2:
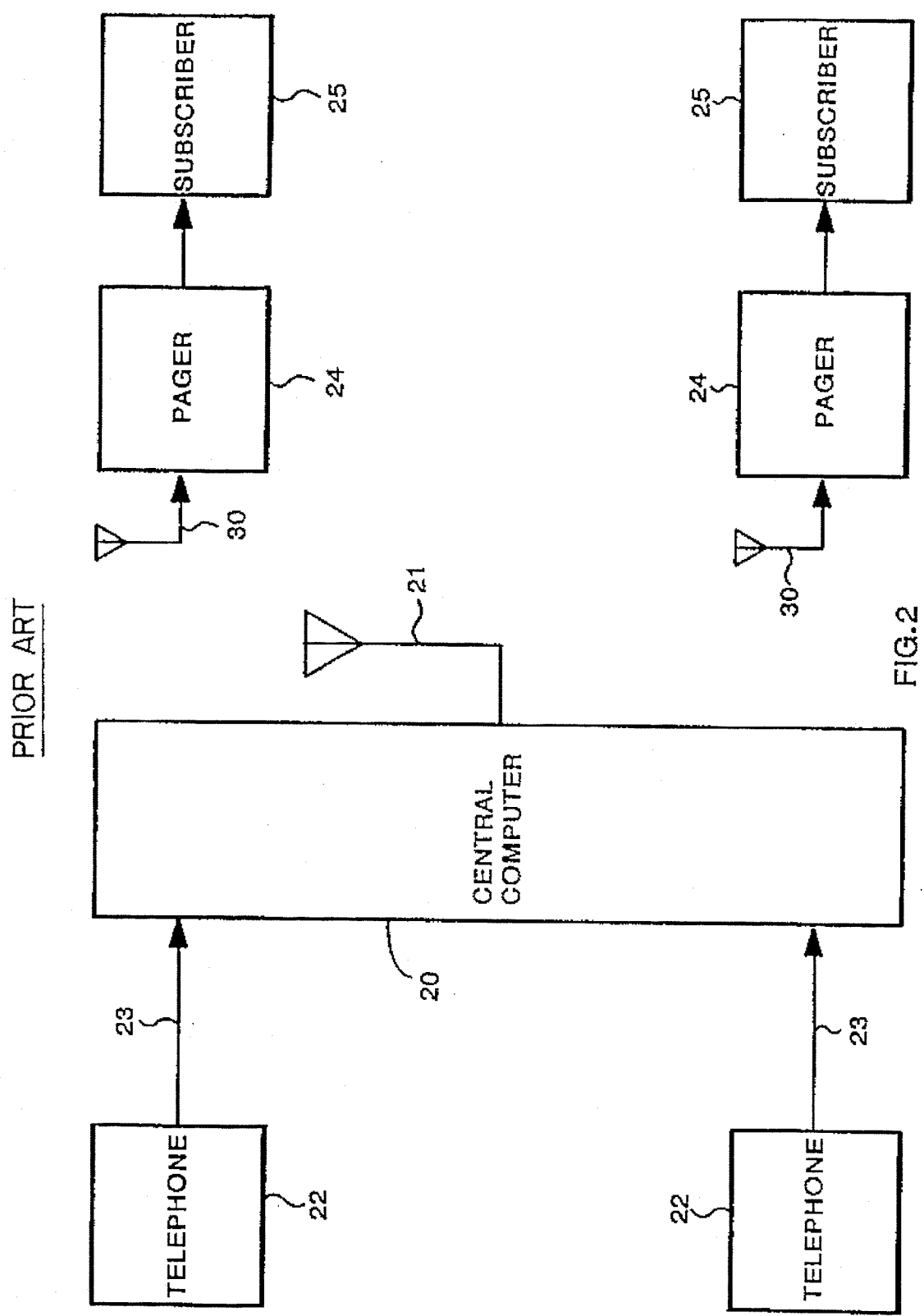
FIG. 2 is a block diagram of a conventional telephone paging system.

A conventional telephone paging system is generally illustrated in FIG. 2. It comprises a central database 20 which includes a transmitting antenna 21, telephones 22 connected to the central database 20 by communication channels 23, and pagers 24, each being operable to signal a pager-bearing subscriber 25 and each including a receiving antenna 30 operable to link the respective page 24 to the central database 20 via transmitting antenna 21.

In operation, a user wishing to contact a subscriber 25 places a message on the central database 20 via line 23 using telephone 22. Transmitting antenna 21 will subsequently broadcast a signal addressed to one of the plurality of pagers 24 which is received at its antenna 30 if the pager 24 is located within the broadcast range of the transmitting antenna 21. The pager 24 will then signal the subscriber 25 by beeping, flashing, oscillating, or displaying a message.

A card paging system according to the present invention is generally illustrated in FIG. 3. It comprises a central database 40, telephones 41 or modem with a keyboard 46 connected to the central database 40 by first communication channels 42, account authorization devices 43 connected to the central database 40 by second communication channels 44, and identification cards 45 which are operable to represent to the system by identification codes a card-bearing subscriber 50 and which supply the identification codes to the account authorization devices 43. In the case of an electronic banking system, no further elements are required. In the case of a transaction authorization or point-of-sale system, a merchant 51 will take the identification card 45 from the subscriber 50 and supply the identification codes of the card 45 to the account authorization device 43.

OPERATION

In operation and with reference to FIG. 3, a user wishing to contact a subscriber 50 to provide an emergency message or otherwise will enter a message in the central database 40 via a telephone 41 or modem with a keyboard 46 connected to the telephone line 42. In order to enter the message, the user will identify the target subscriber 50 to the central database 40. This identification is conveniently done by submitting an alphanumeric code unique to each subscriber 50 and provided to the user by the subscriber or by the user submitting specific identifying information about the subscriber such as providing the name and address of the subscriber.

Subsequently and in the course of conducting a normal financial or commercial transaction, the subscriber 50 to whom the emergency message is addressed will submit an identification card 45 to the account authorization device 43 either directly in the case of an electronic banking machine or indirectly through merchant 51 as in a point of sale transaction.

The account authorization device 43 conveys the identification code to the central database 40 over communication channel 44. The central database 40 uses the identification code to locate the subscriber's 44 account record to determine if the transaction should proceed. At the same time, the central database 40 will check to determine if any messages are intended for the subscriber 50. The transaction decision and any message is conveyed back to the account authorization device 43 via communication channel 44 and the message information is conveyed to the subscriber 50 by the ATM or by merchant 51.

It is envisioned that the above described card paging system could either be made universally available to all card holders or be made available as an extra subscription service to only those card holders who desired it.

Although a specific embodiment of the invention and the method used to apply the invention have been described, such description should be considered illustrative of the invention only and not as limiting its scope as defined in accordance with the accompanying claims.

What is claimed is:

1. A system for supplying non-financial information to the holder of a bank or charge card of a financial institution and bearing an authorization code, said system comprising a central database, means for placing financial information of said financial institution relating to said holder in said central database, means for placing non-financial information received from a party other than said financial institution and intended for said holder in said central database, an account authorization device to read said authorization code of said bank or charge card, said authorization code borne by said bank or charge card being the sole identification required to identify said holder to said central database so as to forward said non-financial information to said holder.

2. A system as in claim 1 wherein said non-financial information is emergency information relating to said holder.

3. A system as in claim 2 wherein said bank or charge card is a credit card.

4. A system as in claim 2 wherein said bank or charge card is an ATM card.

5. A system as in claim 2 wherein said bank or charge card is a debit card.

6. A system as in claim 2 wherein said account authorization device includes a card reader located remotely from said central database.

7. A system as in claim 6 wherein said account authorization device is an ATM machine.

8. A system as in claim 6 wherein said account authorization device is a commercial transaction card reader.

9. A system as in claim 8 wherein said non-financial information is conveyed to said holder from said card reader by a third party.

10. A system as in claim 9 and further including means to convey said non-financial information between said party and said central database.

11. A system as in claim 10 wherein said conveying means for said non-financial information is a communication line.

12. A system as in claim 11 wherein said conveying means for said non-financial information includes a modem and an input keyboard.

13. A system as in claim 2 wherein said party other than said financial institution identifies said holder to said central database by submitting identifying information.

14. A system as in claim 13 wherein said identifying information includes an alphanumeric code.

15. A system as in claim 13 wherein said identifying information includes the holder's name and address.

16. A method for a user to contact a subscriber having a bank or charge card of a financial institution, comprising the steps of:

a) said user contacting said financial institution and providing specific identifying data unique to said subscriber;

b) said user providing said financial institution with non-financial information intended to be provided to said subscriber;

c) said financial institution placing at least some of said non-financial information into a central database intended for transmitting to said subscriber; and d) said financial institution conveying said non-financial information to said subscriber when said subscriber uses said bank or charge card, without said subscriber entering further identifying data other than identifying data borne by said bank or charge card.

17. A method as in claim 16 wherein said non-financial information is emergency information relating to said subscriber.

18. A method as in claim 17 wherein said bank or charge card is a credit card.

19. A method as in claim 17 wherein said bank or charge card is an ATM card.

20. A method as in claim 17 wherein said bank or charge card is a debit card.

21. A method as in claim 17 wherein said identifying information includes an alphanumeric code.

22. A method as in claim 17 wherein said identifying information includes the subscriber's name and address.

* * * * *